United States Patent
Funfstuck et al.

[15] 3,677,260
[45] July 18, 1972

[54] ARRHYTHMIA DETECTOR

[72] Inventors: Horst Funfstuck; Shmuel Elazar, both of Camarillo, Calif.

[73] Assignee: Statham Instruments Inc., Oxnard, Calif.

[22] Filed: Sept. 4, 1970

[21] Appl. No.: 69,634

Related U.S. Application Data

[63] Continuation-in-part of Ser. No. 69,796, Sept. 4, 1970.

[52] U.S. Cl. .....................................................128/2.06 A
[51] Int. Cl. ...........................................................A61b 5/04
[58] Field of Search ....................128/2.05 T, 2.06 A, 2.06 F, 128/2.06 R

[56] References Cited

UNITED STATES PATENTS

| 3,174,478 | 3/1965 | Kahn | 128/2.06 F |
| 3,438,368 | 4/1969 | Karsh | 128/2.06 A |
| 3,474,778 | 10/1969 | Yen | 128/2.06 F |

FOREIGN PATENTS OR APPLICATIONS 1,264,680  3/1968  Germany..........................128/2.06 F

*Primary Examiner*—William E. Kamm
*Attorney*—Philip Subkow and Kendrick and Subkow

[57] ABSTRACT

This application relates to means for measuring and recording variations in frequency of repetitive events which may be subject to large changes in frequency and is particularly useful in connection with the measuring and recording of the frequency of ectopic heartbeats. This is accomplished by generating the train of pulses responsive to the frequency of the events of interest, establishing a potential responsive to the frequency of said train of pulses, generating a linear sawtooth pulse whose amplitude is responsive to the frequency of the applied pulses and comparing said amplitude of said sawtooth pulse with a reference potential, establishing the difference between the amplitude potential and said reference potential, means responsive to said difference to indicate the frequency of the pulses resulting in said difference whose magnitude varies from that resulting from a predetermined variation of the frequency of said repetitive events.

6 Claims, 5 Drawing Figures

ARRHYTHMIA DETECTOR

This application is a continuation in part of application Ser. No. 69,796 filed Sept. 4, 1970 for Cardiac Tachometer.

BACKGROUND OF THE INVENTION

While the system of our invention is useful wherever it is desired to obtain intelligence of the variation in frequency of repetitive events, it is particularly useful where the intervals between the events are substantial. The system for which the following circuits are designed and which constitutes the preferred mode of operation of our invention is for the determination of the frequency of ectopic heartbeat rates.

When, in general, in a normally healthy person the heartbeat generates a uniform pulse train of relatively regular frequency, variations in frequency of about ± 10 percent are considered normal. However, variations substantially in excess of ± 10 percent are ectopic and they indicate a malfunction of the heart or the cardiovascular system. It has been suggested, to determine the pulse rate by averaging the periodic output of EKG units by averaging RC circuits. Such a system will represent the frequency of the pulses, where the pulses are substantially of equal period and wave shape and have substantially constant frequency. However, if the frequency is either irregular or varies widely, the average value may be grossly misrepresentative of the frequency of a pulse train or fail to respond to such variations. It is not unusual even in normally healthy persons to find irregular heartbeats such that the EKG signal has a variable and sometimes irregularly variable heartbeat pulse rate output.

In our copending application, Ser. No. 69,796, of which this application is a continuation-in-part, a cardiac tachometer is disclosed which will follow and promptly report pulse rates which vary over a substantial range of frequency and be responsive to either rapid or slow changes in the pulse frequency to accurately record such frequency. Said application is hereby incorporated by this reference as if fully set forth in this specification at this place.

It is the object of the system of this present application to report promptly the frequency of ectopic heartbeats which are the result of premature ventricle contraction and to distinguish between such ectopic heartbeats and normal variations of heartbeat rate and premature atrial contraction.

The system of the present invention responds to the frequency of heartbeats which are higher than the upper limit of the normal variation in heartbeat frequency or lower than the lower limit of normal variations of heartbeat frequency. This is accomplished by establishing a pulse responsive to the heartbeat rate and of amplitudes which are responsive to said heartbeat frequency. This amplitude is compared with the reference voltage and results in the generation of a potential which is responsive to the frequency of the pulses whose frequency is higher or lower than a predetermined upper or lower limit, and provides means for selectively indicating the frequencies of ectopic pulse beats resulting from premature ventricle contraction.

This invention will be further described in connection with the drawings in which.

Figure 1:
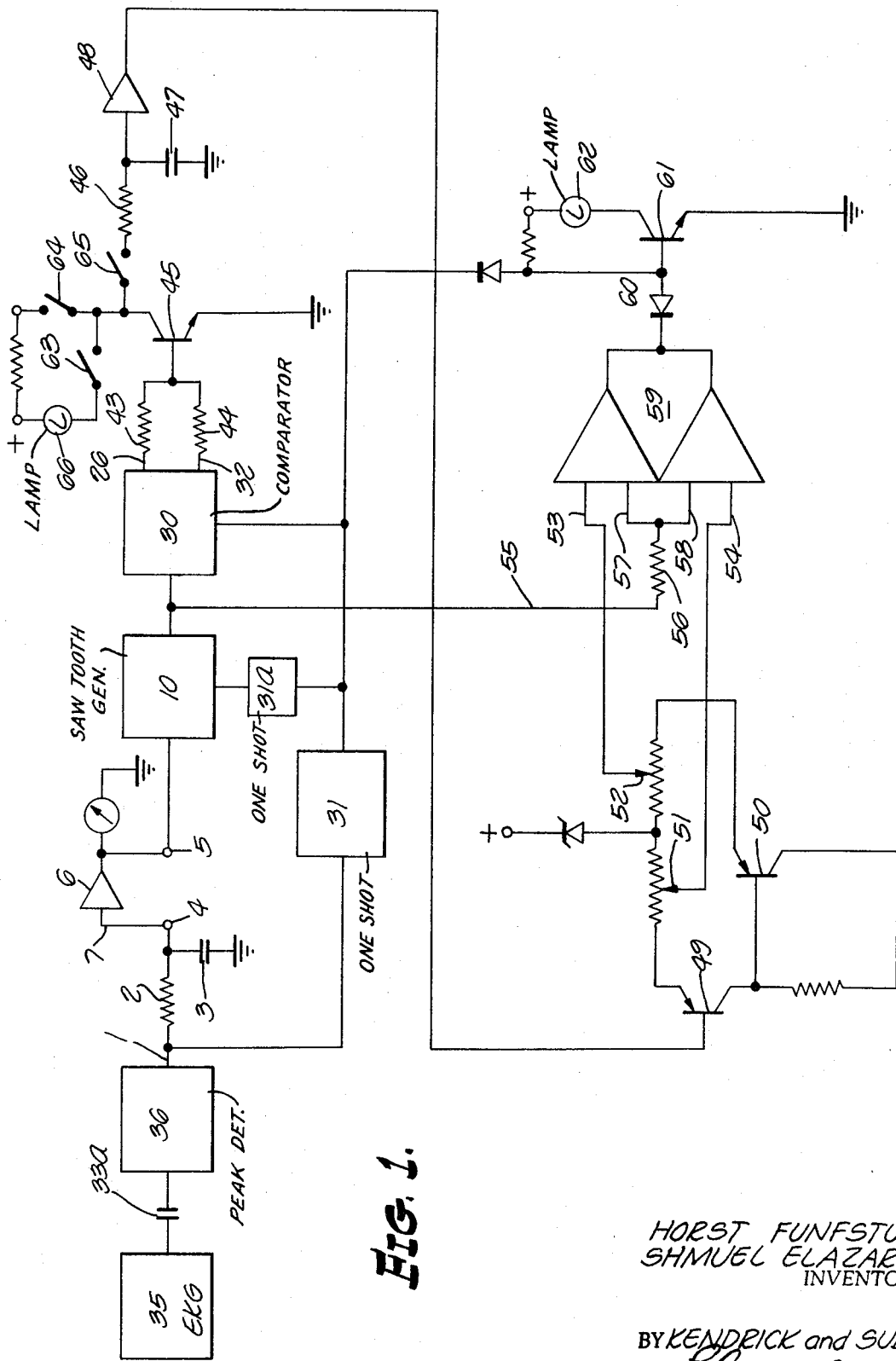
FIG. 1 is a schematic diagram of the system of our invention.

In FIG. 1, the heartbeat pulse generated by the EKG is conditioned by an R peak pulse generator at 36 to be more fully described below.

The square wave at the frequency of the heartbeat generated by the R peak pulse generator enters an RC circuit 2 and 3 and passes through a buffer amplifier 6 of unitary gain and enters the sawtooth wave generator at 10. The pulse at 1 also triggers the one-shot multivibrator 31 whose output is connected through a second one-shot multivibrator 31a to terminate the ramp voltage at the sawtooth generator 10. The sawtooth pulse is applied to the voltage comparator 30 to generate a voltage when the sawtooth pulse amplitude is above or below predetermined reference voltages. Where the sawtooth amplitude is above the reference voltage, the potential is applied at 26. When below the reference voltage, the voltage appears at 32.

With switch 63 closed and switches 64 and 65 open, the appearance of a voltage at 43 and 44 can be used to light the lamp 66. Normal heartbeat variations do not generate a voltage at 26 or 32. Such a system is adequate for the purpose of reporting any excessive change in the normal heartbeat rate. Where, however, it is desired to distinguish between the occurrences of an arrhythmia arising from a premature ventricle contraction as compared to normal heartbeats, the reference voltages according to this invention are made responsive to the frequency of the ectopic voltages arising from the premature ventricle contraction.

In order for the light 62 to be actuated, a potential must be established at 59 sufficient to trigger the gate 61. This is accomplished according to this invention by summing the pulse voltages at 43 and 44 in 46 and 47, switch 64 and 65 closed and 63 open. The potential at 47 is proportional to the frequency of the applied pulse. Due to 48 an amplified voltage is applied at 49 to cause an increase in the potential at 51 and a decrease of the potential at 52. When the amplitude of the sawtooth pulse at the output of 10 applied at 57 and 58 is either above or below the reference voltage in the voltage comparator 59, responsive to the potential at 51 and 52, light 62 will light.

Figure 5:
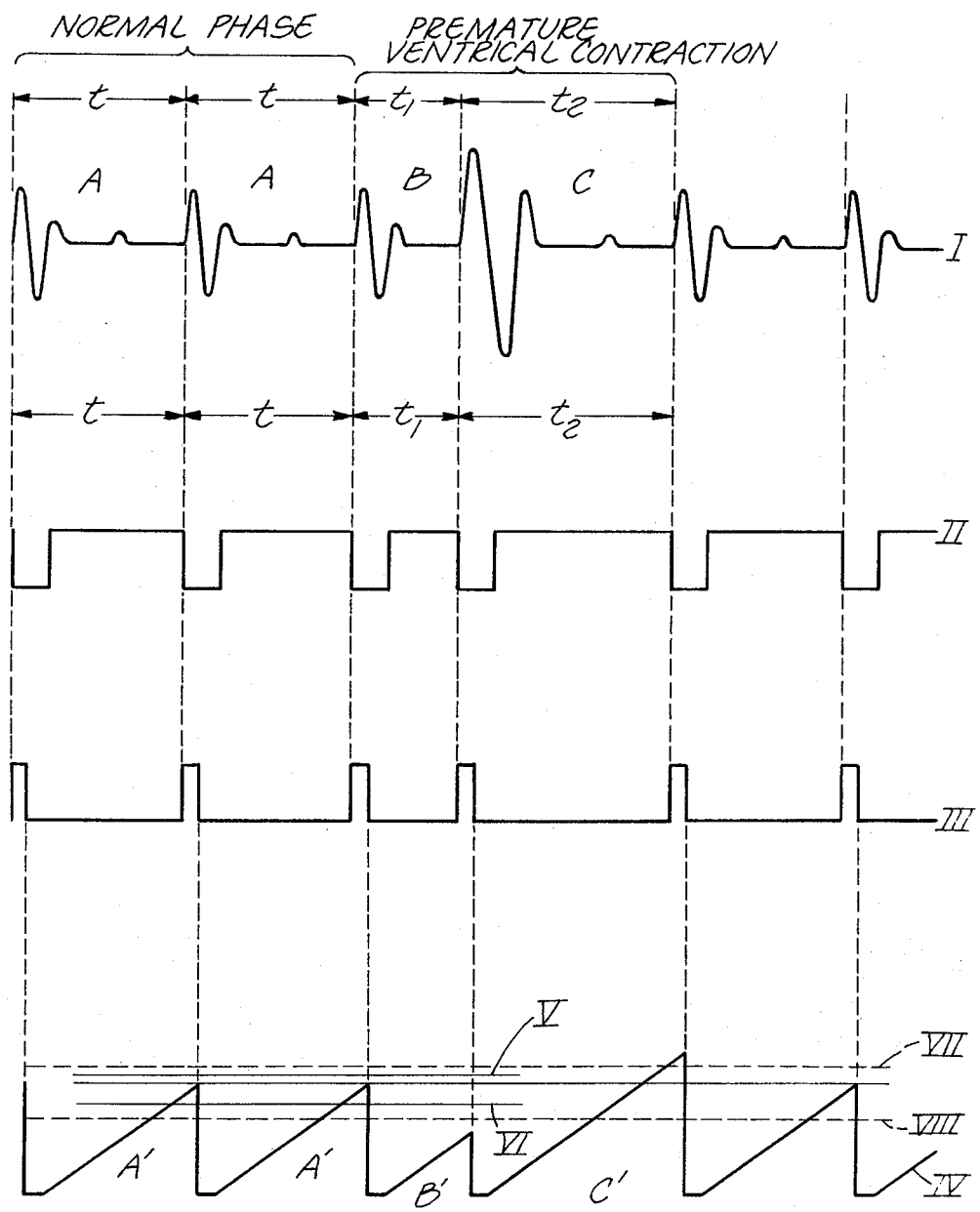
FIG. 5 is a Time Diagram of the circuits of our invention.

FIG. 5 illustrates the functioning of the arrhythmia detector of our invention. In the time diagram of FIG. 5, "I" illustrates one form of sequence including a premature ventricular contraction. "A" represents a normal heartbeat frequency. "B" indicates the arrival of an R wave prematurely indicating a premature ventricular contraction. This is followed by "C", which is a compensatory pulse with an interval twice the interval of "B".

It will be noted that the interval of the normal heartbeat as shown on FIG. 5 is about 1.6 times the interval of "B" and that the interval of "C" is about twice that of "B". While these intervals are to be taken merely as illustrative, recognizing that they will vary even for the same person from time to time and from person to person, they are, however, illustrative of a significant premature ventricular contraction. The period of the wave, i.e., the time interval "$t$" of "B", is significantly different from the normal heartbeat variation which, as we said above, may be expected to be about ± 10 percent of the normal heartbeat frequency.

Figure 2:
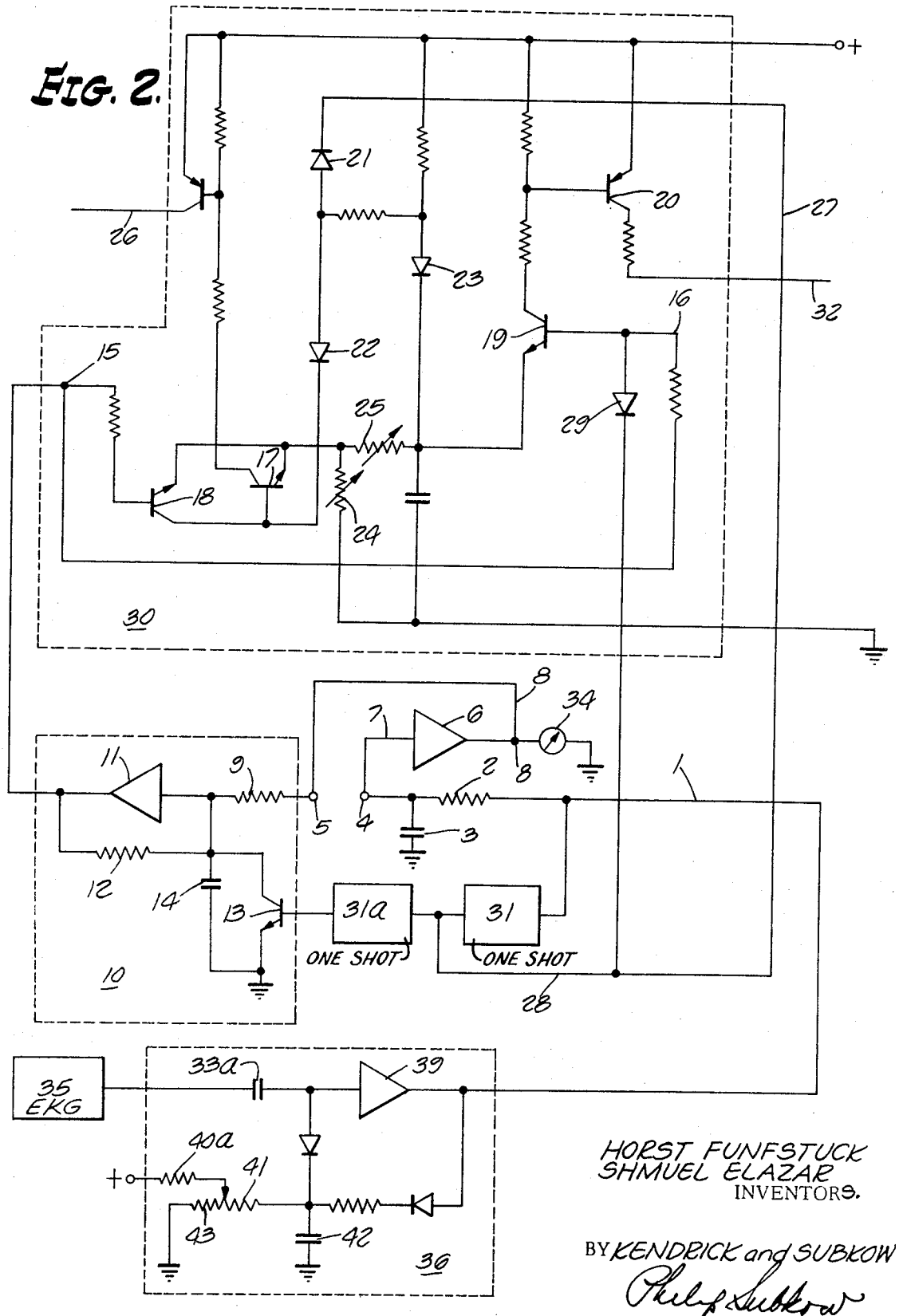
FIG. 2 is a more detailed circuit diagram of one of the elements of the system of FIG. 1.
Figure 4:
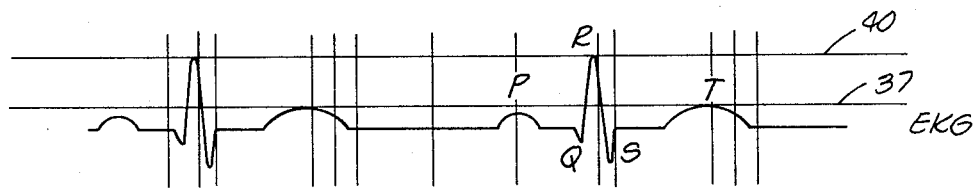
FIG. 4 is a chart of a characteristic heartbeat pulse.

In FIG. 2, a preferred embodiment of the circuit labeled 35, 36, 6, 10, 31 and 30 on FIG. 1 is shown. 35 is a conventional EKG circuit which may be used to deliver a signal in the form of a train of pulses responsive to the heartbeats of interest. Such a wave is shown in FIG. 4 and 5. The EKG is capacitively coupled to an R pulse detector 36. The R pulse detector is a peak pulse generator responsive to the potentials of the R wave at 40, FIG. 4, which are in excess of the maximum potentials of the other component waves of the heartbeat wave, i.e., at 37.

With no pulse entering amplifier 39, the capacitor 42 is at a potential determined by the voltage divider 40a and 43. The resistance 41 is of a magnitude to produce a large time constant of the capacitor 42 resistance 41 circuit. A pulse entering via capacitor 33a must establish a potential input at amplifier 39 which is greater than that at 42 to cause the amplifier 39 to be forward biased. This potential is set to be that proportional to the potential equivalent to 37 (FIG. 4) by suitable adjustment of the voltage divider, 43, 41. When the potential at amplifier 39 rises to the level equivalent to the voltage at 40 (FIG. 4) of the R wave and passes over the peak, amplifier 39 becomes reverse biased and the output at 39 goes to the reference potential, which may be zero. The capacitor 42 on arrival of the subsequent R pulse will be at a slightly lower potential than that previously attained on the arrival of the previous R pulse (see supra) due to the small discharge during said interval through the high resistance 41.

The result is a square wave pulse at the frequency of the R wave, and illustrated on FIG. 5 at II.

The resultant train of square wave pulses enter an RC circuit composed of resistor 2 and capacitor 3. The input 7 to the amplifier 6 of unit gain is connected at 4. The output 8 of the amplifier 6 is connected at 5 which is at the same potential as 4 at the RC circuit.

The output 8 of the amplifier 6 is connected to a suitable meter or recorder 34. Capacitor 3 is charged by the square wave pulse train passing through 2 to a potential proportional to the frequency of the square wave pulse train. Since amplifier 6 has unitary gain, the voltages at 4, 8 and 5 are all equal. The potential at 4 will be proportional to the frequency of the pulse train charging 3.

The output of the amplifier 6 is connected to the ramp voltage generator 10 composed of an operational amplifier 11, resistors 9 and 12, and the gate transistor 13, shunting the grounded capacitor 14. The base of the transistor 13 is connected to the output of the one-shot multivibrator 31a and 31, whose input is connected to the input 1, resulting in a wave form illustrated at III of FIG. 5.

The output of the operational amplifier 11 is connected to the inputs 15 and 16 of the voltage comparator 30, composed of transistors 17 and 18 on the one hand and 19 and 20 on the other, all coupled by the gating diode 21, isolation diode 22, and temperature compensating diode 23.

The reference voltages at the emitter of 17 and 19 are set by the variable resistors 24 and 25, with the potential at 19 set higher than that at 17.

A pulse entering the one-shot multivibrator 31 results in a pulse which is delivered to 17 and 19 and therefore 31 shuts off on the termination of the pulse, the one-shot multivibrator 31a is activated to establish bias at the base of the gate transistor 13, to short the capacitor 14 and to connect the input of 11 to ground. This generates a sawtooth pulse.

With resistor 9 equal in value to resistor 12, the ramp voltage is linear, and the resultant sawtooth pulse is at a frequency equal to the frequency of the train of pulses entering at 1.

The relationship of the voltage $e_i$ at 5 to the amplitude of the sawtooth wave at the output of 11, $e_o$, is given by the formula $e_o = 2e_i t/CR$, where $t$ is the period of the sawtooth wave which, as stated above, is proportional to the frequency of the incoming square wave pulse train; and C and R are the capacitance and resistance of 14 and 9. See *Electronic Engineering*, Dec. 1969, page 76.

If the intervals between succeeding pulses are all of the same value, the succeeding sawtooth wave trains will be of like uniform frequency and like amplitude, so long as the input potential at 5 is constant. Since "$t$" is determined by the frequency of the input pulse at 1, $e_o$ will remain constant if the frequency of the pulse train at 1 remains constant. If the pulse rate changes, then the potential at 5 will change very slowly responsive to the change in the pulse rate and cause a corresponding change in the amplitude of the sawtooth wave generated at 11. Wave form IV of FIG. 5 illustrates the resultant sawtooth wave form corresponding to the wave form I. The potential at the apex of the sawtooth wave referred to a reference potential varies inversely as the time value of the interval of the corresponding cycle arriving at 31 and 2.

The arrival of a pulse at the input turns on the comparator 30 under the influence of the one-shot and the diodes 21 and 29. With the emitter of 19 illustrated by V of FIG. 5 set at a higher potential than the emitter at 17, illustrated by VI of FIG. 5, by proper adjustment of the resistors 24 and 25, the potential at 15, when the pulse voltage is applied, is more than at the emitter of 17 but less than the emitter of 19; transistor 45 (FIG. 1) is biased so that the circuit 46 is open.

The potential of the emitter of 17 may be set to correspond to that potential at 15 which is proportional to a pulse frequency at 1 which is at about 90 percent of the normal heartbeat rate and that at the emitter of 19 to a pulse frequency at 1 which is at about 110 percent of the normal heartbeat frequencies. These are given only by way of illustration and not as a limitation of our invention. Should the pulse rate decrease, for example, so as to increase the interval "$t$", the voltage at 15 and 16 will rise. If the voltage rises above the voltage at 17 but does not rise above that at the emitter of 19, as is illustrated by the peak at $A^1$ of IV, the transistor 45 remains reverse biased and the circuit through 46 is opened. If the pulse rate decreased sufficiently so that the resultant potential at 15 and 16 is in excess of the potential at the emitter of 19 as is illustrated by $C^1$, then transistor 20 is biased to conductive condition and the circuit through 17 remains open, but the potential at the collector at 20 is sufficient to trigger the gate 45.

The system previously described is particularly adapted and in its preferred embodiment is employed in connection with the identification and reporting of the existence of ectopic heartbeat pulses resulting from premature ventricle contractions.

Thus, the amplitude of the sawtooth pulse corresponding to the phase B (FIG. 5) of the premature ventricle contraction, i.e., at a smaller value of "$t$" will be smaller than that of the pulses and results in the sawtooth pulse $B^1$. The interval of phase C has a larger value of "$t$".

Normal pulses which apply a potential at 15 and 16 which is between that set at the emitter of 17 and 19 will not trigger the transistor 45.

The pulses which result from the premature ventricle contraction which are at a lower or higher frequency will result in a higher or lower potential sufficient to trigger the gate 45.

The capacitor 47 will be charged to the frequency of the pulses generated at 45. The pulse amplifier in 48 will be applied to 49 to increase the voltage at 51 and decrease the voltage at 52.

Figure 3:
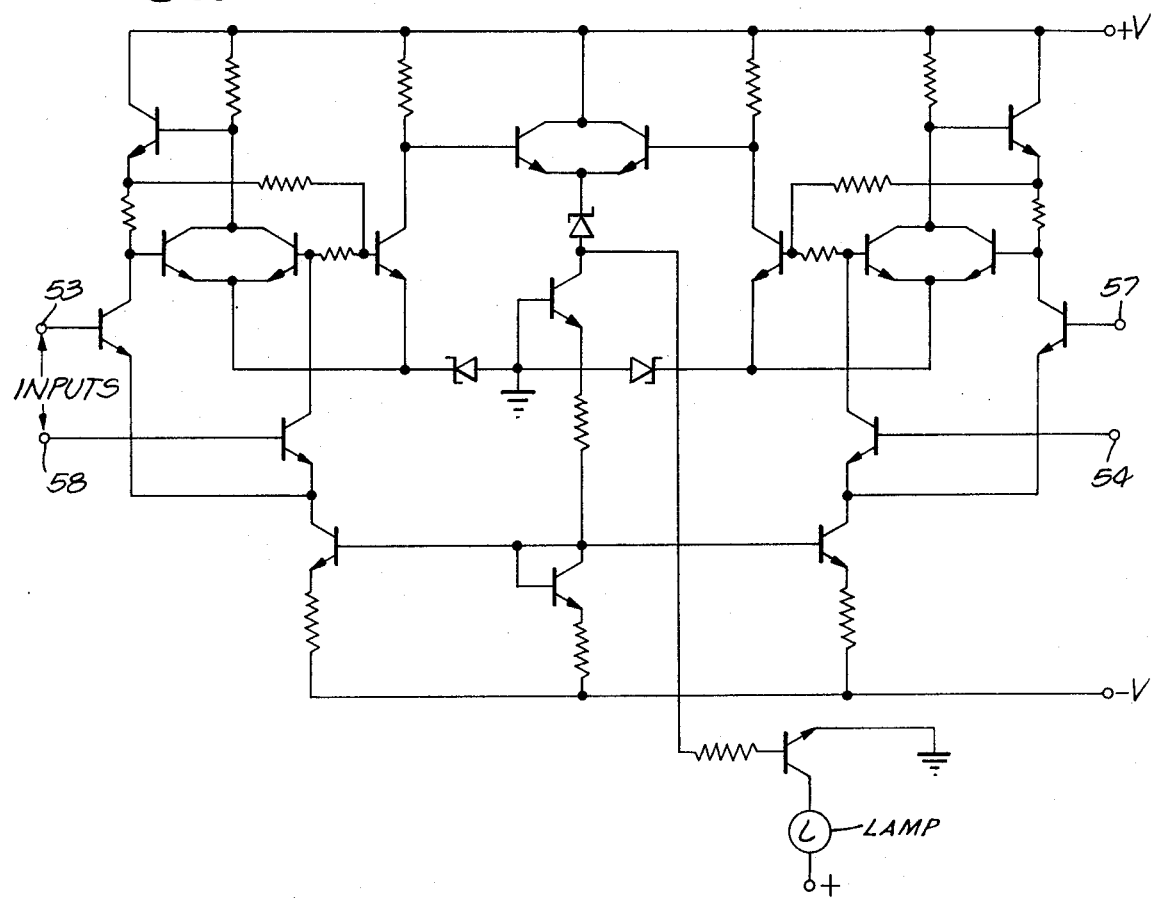
FIG. 3 is a more detailed circuit diagram of another element of FIG. 1.

The voltage comparator 59 is a conventional comparator such as is sold by National Semiconductor Corporation and is identified as LM 711. A schematic diagram is shown in FIG. 3 where the elements are shown by conventional symbols as will be understood by those skilled in the art. The sawtooth pulse applied at the input of 58 and 57 is compared with the potentials of 54 and 53 whose value is a function of the change in frequency of the sawtooth pulse which in turn is proportional to that of the pulses at 1. The initial difference in the potentials at 51 and 52 is made substantially greater than the difference in the potentials at the emitter of 17 and 19.

The voltages at 51, for example, may be said to correspond to a pulse frequency of about 120 percent of a normal heartbeat rate, while that at 52 may be said to correspond to a voltage to about 80 percent of a normal heartbeat rate. These are given as representative and not as limiting values.

When the potential applied at 58 and 57 is in excess of the potential at 51 applied at 54, the output of 59 is high and will cause current to flow through 62 and light the lamp. This will occur for the period that the low frequency premature ventricle contraction occurs.

Since the potential at 53 is the same as the potential set by the voltage divider at 52, which is set much lower in value than that at the emitter 17, the normal heartbeats and even premature atrial contraction will not result in the sufficient potential to cause 61 to become conductive.

On the other hand, if a premature ventricle contraction occurs, the potential at 57 and 58 may vary sufficiently so that 61 becomes conductive and lamp 62 will light indicating the presence of an ectopic premature ventricle contraction.

WHAT IS CLAIMED IS:

1. A cardiac arrhythmia detector comprising:
means to establish a train of pulses responsive to heartbeats;
means to establish a dc potential responsive to said train of pulses;
means to establish a sawtooth pulse responsive to said dc potential and to the frequency of said train of pulses;
means to establish a reference potential;

means for comparing the potential of the amplitude of said sawtooth pulse with a reference potential;

means for establishing a second reference potential responsive to the difference between the potential of the amplitude of said sawtooth pulse and said reference potential; and means for comparing the potential of the amplitude of said sawtooth pulse with the second reference potential and means to indicate a sawtooth pulse amplitude potential in excess of said second reference potential as an indication of an ectopic pulse beat.

2. An arrhythmia detector according to Claim 1, in which said means for establishing a train of pulses responsive to said heartbeats includes an R pulse detector, said R pulse detector comprising an RC circuit responsive to said first mentioned train of pulses, means to generate a potential responsive to the potential of the train of pulses arising from that fraction of the R portion of the pulse whose amplitude is in excess of the amplitude of the remaining portions of said heartbeat pulse, means to apply said potential to said R C circuit, means responsive to said potential at said RC circuit to generate a train of square wave pulses at the frequency of said R wave fraction, and means responsive to the frequency of such train of square waves to generate the aforesaid first mentioned dc potential.

3. In the arrhythmia detector according to claim 1, said means to establish said second reference potential, including a second RC circuit, to establish said second dc potential responsive to said difference potential and means for applying said second dc potential, to establish said second reference potentials responsive to said second dc potential.

4. In the cardiac arrhythmia detector according to Claim 1, said means for comparing said sawtooth amplitude potential with said first mentioned reference potential, comprising means to establish a reference potential responsive to the frequency of heartbeat pulses of rate less than the normal heartbeat pulse rate and another reference potential responsive to the heartbeat pulse frequency greater than normal heartbeat pulse frequency rate, said other reference potential being higher than said first mentioned reference potential and comparing the potential of the amplitude of the sawtooth pulse with each of said reference potentials and applying the difference between the amplitude potential of said sawtooth pulse and said second named reference potential to said indicating means to indicate the ectopic pulse beat.

5. An arrhythmia detector according to claim 1, in which said means for establishing a train of pulses responsive to said heartbeats includes an R pulse detector, said R pulse detector comprising an RC circuit responsive to said first mentioned train of pulses means to generate a potential responsive to the potential of the train of pulses arising from the fraction of the R position of the pulse whose amplitude is in excess of the amplitude of the remaining portions of said heartbeat pulse, means to apply said potential to said R C circuit, means responsive to said potential at said RC circuit to generate a train of square wave pulses at the frequence of said R wave fraction, and means responsive to the frequency of such train of square waves to generate the aforesaid first mentioned dc potential, said means to establish said first mentioned second reference potential, including a second RC circuit, to establish a second dc potential responsive to said difference potential, means for applying said second dc potential, to establish said second reference potentials responsive to said second dc potentials.

6. An arrhythmia detector according to claim 1, in which said means for establishing a train of pulses responsive to said heartbeats includes an R pulse detector, said R pulse detector comprising an RC circuit responsive to said first mentioned train of pulses, means to generate a potential responsive to the potential of the train of pulses arising from that fraction of the R portion of the pulse whose amplitude is in excess of the amplitude of the remaining portions of said heartbeat pulse, means to apply said potential to said R C circuit, means responsive to said potential at said RC circuit to generate a train of square wave pulses at the frequency of said R wave fraction, and means responsive to the frequency of such train of square waves to generate the aforesaid first mentioned dc potential, said means to establish said second reference potential, including a second RC circuit, to establish a second dc potential responsive to said difference potential, means for applying said second dc potential, to establish said second reference potentials responsive to said second dc potential, said means for comparing said sawtooth potential with said first mentioned reference potential comprising means to establish a reference potential responsive to the frequency of heartbeat pulses of rate less than the normal heartbeat pulse rate and another reference potential responsive to the heartbeat pulse frequency greater than normal heartbeat pulse frequency rate, said other reference potential being higher than said first mentioned reference potential and comparing the potential of the amplitude of the sawtooth pulse with each of said reference potentials and applying the difference between the amplitude potential of said sawtooth pulse and said second named reference potential.

* * * * *